E. Wyckoff,
Portable Soda Fountain.

Nº 43,251.    Patented June 21, 1864.

Witnesses:    Inventor:

UNITED STATES PATENT OFFICE.

ELIAS WYCKOFF, OF ELMIRA, NEW YORK.

IMPROVED SODA-WATER APPARATUS.

Specification forming part of Letters Patent No. 43,251, dated June 21, 1864.

*To all whom it may concern:*

Be it known that I, ELIAS WYCKOFF, of Elmira, in the county of Chemung and State of New York, have invented a new and useful Improvement in Soda-Fountains; and I do hereby declare that the following is a full, clear, and exact description of the same, which will enable any person skilled in the art to make and use the same, reference being had to the accompanying drawings, making a part of this specification, in which—

Figure 1:
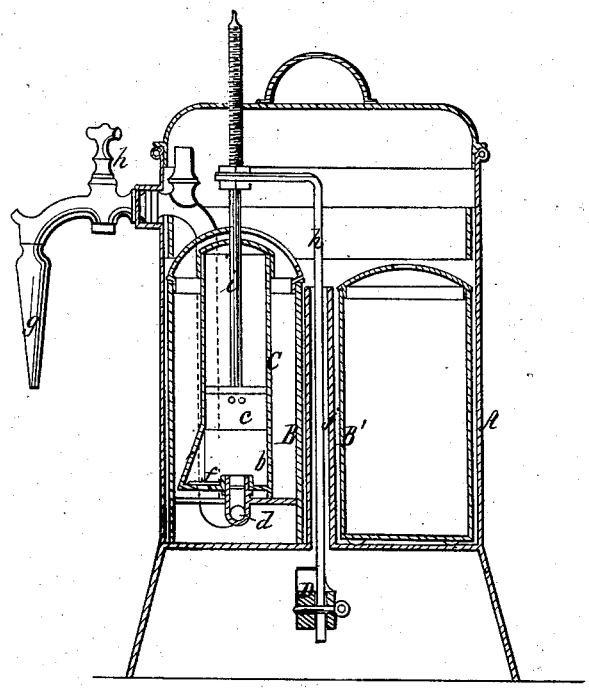
Figure 2:
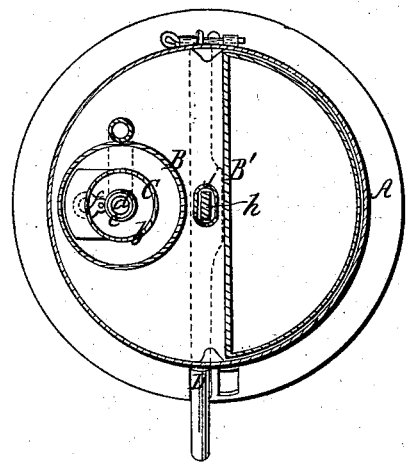

Figure 1 represents a vertical central section of my invention. Fig. 2 is a horizontal section of the same.

Similar letters of reference indicate like parts.

This invention relates to an improvement in that class of fountains known as "refrigerating soda-fountains," in which the hydrated preparation of supercarbonate of soda is contained in a vessel inclosed in a refrigerating-chamber and provided with a pump which serves to force the preparation of soda out through a suitable spout into a tumbler or goblet containing acidulated sirups.

The invention consists in the arrangement of a force-pump within the vessel containing the alkaline preparation, in combination with the refrigerating-chamber and with a suitable lever and connection-rod, in such a manner that the pump can be conveniently operated by foot or hand or by any other power, and the alkaline liquid is completely inclosed by the refrigerator-chamber until discharged by the action of the pump.

A represents a vessel, made of tin or any suitable material, in the shape of a cylinder or in any other desirable form. This vessel may be made with double walls filled in with coal-dust or other bad conductor of heat, so that its contents are insulated as much as possible from the outside atmosphere. The interior of this vessel is occupied by two or more secondary vessels, B B', which may be cylindrical or semi-cylindrical, or in any other desirable form or shape, and so arranged that they can be taken out; or they may be firmly secured in the inside of the vessel A. These secondary vessels are intended to contain the alkaline preparation or any other liquid used in the preparation of soda-water, and one or both of them contain a force-pump, C, consisting of a barrel, $b$, in which a piston, $c$, works, and which is screwed or otherwise fastened to a pipe, $d$, rising from the bottom of the vessel containing the pump. The pipe $d$ is provided with a suitable valve, $e$, opening from the vessel B, and another valve, $f$, in the bottom of the barrel $b$, opens inward, so that by raising the piston the valve $e$ closes and the valve $f$ opens, and the liquid from the vessel B enters the barrel $b$. On depressing the piston the valve $f$ closes and the valve $e$ opens, and the liquid contained in the lower part of the barrel passes out through the pipe $d$. This pipe communicates with the spout $g$ on the outside of the refrigerating-chamber A, and by opening a faucet, $n$, which forms the connection between the spout and pipe $d$, the liquid from the barrel is forced out through the spout into a tumbler or goblet held under it. This tumbler or goblet is intended to contain a small quantity of acidulated syrup, and when the refrigerated supercarbonate comes in contact with the acid the carbonic acid is liberated and a cooling, agreeable, and healthy drink is obtained.

The pump C is operated by a lever, D, which is keyed to one side of the base supporting the refrigerating-chamber A, and which connects by means of a rod, $h$, with the piston-rod $i$. The rod $h$ passes up through an oblong tube, $j$, in the center of the refrigerating-chamber, and it is obvious that from one and the same lever two or more pumps can be operated.

The number of the vessels B within the chamber A may be increased at pleasure, and said vessels may contain the same or different liquids, which, when cooled by the action of the refrigerating agent in the chamber A, can be forced out by the action of a pump, in the manner above described.

What I claim as new, and desire to secure by Letters Patent, is—

The arrangement of the pump C within the vessel B, in combination with the refrigerating-chamber A and lever D, constructed and operating in the manner and for the purpose substantially as herein shown and described.

ELIAS WYCKOFF.

Witnesses:
D. H. WICKS,
C. W. WYCKOFF.